(12) United States Patent
Ravi

(10) Patent No.: US 9,420,324 B2
(45) Date of Patent: Aug. 16, 2016

(54) CONTENT ISOLATION AND PROCESSING FOR INLINE VIDEO PLAYBACK

(71) Applicant: PARRABLE, INC., New York, NY (US)

(72) Inventor: Dharun Ravi, Plainsboro, NJ (US)

(73) Assignee: PARRABLE, INC., New York, NY (US)

( * ) Notice: Subject to any disclaimer, the term of this patent is extended or adjusted under 35 U.S.C. 154(b) by 0 days.

(21) Appl. No.: 14/500,807

(22) Filed: Sep. 29, 2014

(65) Prior Publication Data
US 2015/0095957 A1    Apr. 2, 2015

Related U.S. Application Data

(60) Provisional application No. 61/884,598, filed on Sep. 30, 2013.

(51) Int. Cl.
| | |
|---|---|
| H04N 7/16 | (2011.01) |
| H04N 21/414 | (2011.01) |
| H04N 21/439 | (2011.01) |
| H04N 21/4402 | (2011.01) |
| H04N 21/4782 | (2011.01) |
| H04N 7/173 | (2011.01) |
| H04N 11/20 | (2006.01) |

(52) U.S. Cl.
CPC ..... *H04N 21/41407* (2013.01); *H04N 21/4398* (2013.01); *H04N 21/4402* (2013.01); *H04N 21/4782* (2013.01)

(58) Field of Classification Search
CPC ............. H04N 21/41407; H04N 21/4398; H04N 21/4782; H04N 21/4402
USPC ........................................ 725/62, 87; 348/441
See application file for complete search history.

(56) References Cited

U.S. PATENT DOCUMENTS

| | | | |
|---|---|---|---|
| 2008/0189272 A1* | 8/2008 | Powers et al. ..................... 707/5 |
| 2011/0197237 A1 | 8/2011 | Turner | |
| 2012/0109737 A1 | 5/2012 | Setty et al. | |
| 2012/0194734 A1* | 8/2012 | McConville et al. ......... 348/441 |
| 2014/0046767 A1 | 2/2014 | Klanjsek et al. | |
| 2014/0195675 A1 | 7/2014 | Silver | |

OTHER PUBLICATIONS

Apple Support Communities, Connect iPhone directly to Monitor to view photos, Jul. 28, 2010.*

* cited by examiner

*Primary Examiner* — Hoang-Vu A Nguyen-Ba
(74) *Attorney, Agent, or Firm* — Polsinelli LLP

(57) ABSTRACT

The present disclosure relates to methods and apparatus for processing and displaying playback of a video in a handheld device. More specifically, the present disclosure describes an inline video processing and playback, wherein the video playback may be optimized based on variable local conditions, such as the capabilities of the handheld device and the network connection speed.

19 Claims, 6 Drawing Sheets

CONTENT ISOLATION AND PROCESSING FOR INLINE VIDEO PLAYBACK

CROSS REFERENCE TO RELATED APPLICATION

The present disclosure claims priority to U.S. Provisional Patent Application Ser. No. 61/884,598, entitled Mobile Inline Video Method and System, filed Sep. 30, 2013, the contents of which are relied upon and incorporated by reference.

FIELD OF THE DISCLOSURE

The present disclosure relates to methods and apparatus for processing and displaying playback of a video in a handheld device. More specifically, the present disclosure describes an inline video processing and playback, wherein the video playback may be optimized based on variable local conditions, such as the capabilities of the handheld device and the network connection speed.

BACKGROUND OF THE DISCLOSURE

Generally, playback of video on handheld devices from a mobile website is currently impaired by the handling of video files in mobile browsers. Known browsers and video players present the user with a still image or link that, when clicked, suspends the browser application and transfers the user to a full-screen video player native to the mobile operating system that subsequently begins playback of the video asset.

While this may be appropriate for delivery of lengthy video files, including entertainment such as movies, it does not work for video that is intended to be displayed passively inline with a page's content. Attempting to play video within the browser directly on the page as a supplement to the webpage's content using the platform's player is currently impossible for the majority of handheld devices.

SUMMARY OF THE DISCLOSURE

Accordingly, the present disclosure relates to a method and apparatus for efficient and effective inline playback on a mobile device.

Attempts have been made to overcome these limitations, but have poor performance characteristics and limited accessibility. For example, the video display method described in U.S. Patent Application Publication U.S.20130151934, to McConville et. al., titled "Video Display Method" (the "934 publication"), incorporated by reference herein in its entirety, transforms a video asset into individual frames on a server device, compositing those frames into a single image file, transmits the image file to the mobile device, and then limits the view port so only a segment of the image is seen at a time, where each visible segment is a frame.

The view-port of the composite image is then shifted multiple times per second as to match the desired playback framerate, simulating video playback. This method does not perform well since the client device must hold off rendering until the entire composited image to be downloaded. In practice, this imposes a limitation of 10-15 seconds of video maximum that can be displayed. Additionally, since entire frames are being sent this form of playback cannot take advantage of video compression schemes, resulting in file sizes too large to reasonably be delivered over the air without sacrificing quality and/or using low frame-rates.

One general aspect may comprise a mobile device inline playback system including: a mobile communications network access device configured to access a server in logical communication with a digital communications network; and executable software stored on the communications network access device and executable on demand, the software operative with the communications network access device to cause the network access device. The mobile device inline playback system also may comprise transmit a video asset prompt. The mobile device inline playback system also may comprise receive the video asset including audio data and image data. The mobile device inline playback system also may comprise isolate the audio data from the image data. The mobile device inline playback system also may comprise prepare the image data for inline playback. The mobile device inline playback system also may comprise couple the audio data with the prepared image data into a prepared video asset. The mobile device inline playback system also may comprise play the prepared video asset on the network access device.

Implementations may include one or more of the following features. The mobile device where the mobile communications network access device may comprise a cellular phone. The mobile device where the mobile communications network access device may comprise a tablet device. The mobile device where the communications network may comprise a cellular network. The mobile device where the communications network may comprise a wireless internet protocol network. The mobile device additionally including a logical connector to an auxiliary display and the software is additionally operative to cause the video asset to play on the auxiliary display. The mobile device additionally including a logical connector to an auxiliary audio player and the software is additionally operative to cause the video asset to play on the auxiliary audio player. The mobile device where the network access device is further caused to store the prepared video asset. The mobile device where the preparation further may comprise: compression of the image data; and transcoding of the image data.

One general aspect may comprise a method for mobile device inline playback of a video asset, where the method may comprise the method steps of: transmitting a video asset prompt; receiving the video asset including audio data and image data; isolating the audio data from the image data; preparing the image data for inline playback; coupling the audio data with the prepared image data into a prepared video asset; and playing the prepared video asset.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
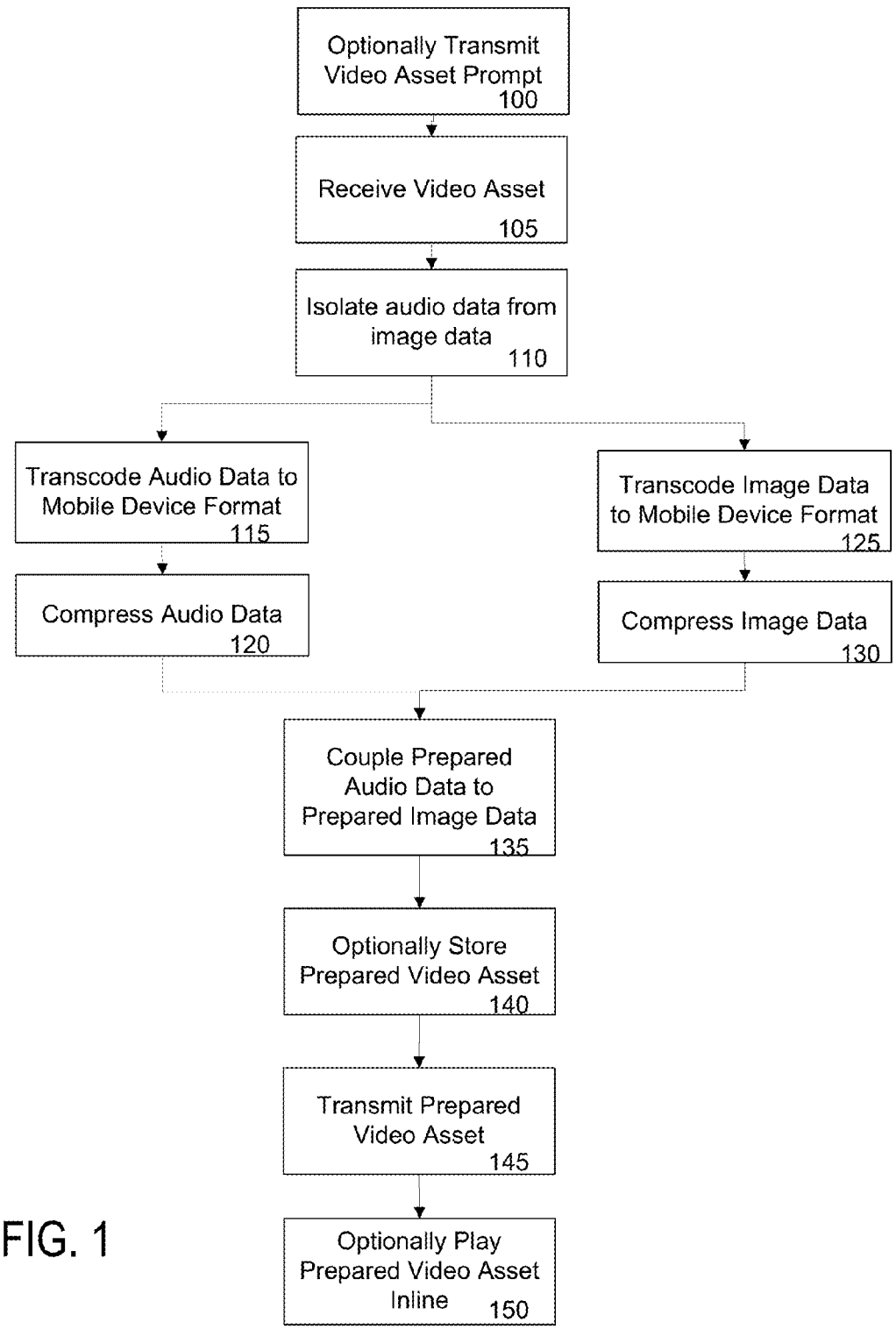
FIG. 1 illustrates exemplary method steps for processing a video asset into a prepared video asset.

The present disclosure relates to methods and apparatus for processing and displaying playback of a video in a handheld device. More specifically, the present disclosure describes an inline video processing and playback, wherein the video playback may be optimized based on variable local conditions, such as the capabilities of the handheld device and the network connection speed.

The present disclosure includes automated apparatus for creating, transmitting and displaying video imagery within a mobile browser on a mobile device. Some preferred embodiments may include apparatus and method steps that maintain compliance with HTML5 technical specification. In some fields of practice, these methods may be desirable for mobile advertising publishers who wish to show video to a user without requiring the user to initiate an event to trigger playback.

Some embodiments of the disclosure include apparatus that prepare a Video Asset for playback by a mobile browser. First, the audio and video streams may be split from the provided asset. The video stream may be run through a process that may scale the video to a standard resolution at a standard frame-rate either selected or predetermined to be best suited for mobile playback. The resulting image sequence may be processed frame-by-frame using a specific algorithm to achieve compressed video output that may be encoded, for example by delta encoding, mpeg-4 encoding, or other video compression schemes.

In another aspect, some embodiments may include transmission of a Video Asset from a server device to a mobile device or desktop computer, and the playback of the asset on the mobile device. A web page may be transmitted from the server device to the mobile device. The web page may comprise one or both program code, typically written in the JavaScript® programming language, and Video Asset location information. The Video Asset location information may be included in the program code, or it may be separately stored in the web page.

Based upon execution of executable program code the present disclosure may configure the mobile device to establish a connection to a Video Asset server device. This connection may be configured as a WebSocket® communication library type connection. The Video Asset server device may begin streaming Video Asset data to the mobile device. When enough data has been received as to recreate a frame, the parts of data may be assembled into an encoded frame before being added to a frame buffer. The mobile device may continue to process incoming data from the WebSocket® stream, converting incoming data into frames. After a certain number of frames have been collected and buffered, the browser may begin to play the video without having to first obtain the entire set of frames that make up the video stream.

In another aspect, in some embodiments, a number of frames buffered before playback is configurable, and may be preset (e.g. 60 frames), or automatically adjust according to bandwidth conditions so that playback will be smooth and continuous.

Audio may be played alongside the video stream using the HTML5-supported "audio" element or other programming platform. This may comprise a tag embedded in the webpage adjacent to the canvas element and accessible by the JavaScript® program code. Upon loading the webpage the mobile browser may be instructed to begin preloading the audio asset. The audio asset may be presented to the browser in several different media formats allowing the browser to select the best fit format for playback.

In the following sections, detailed descriptions of examples and methods of the disclosure may be given. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

Glossary

Inline Play or Playing Inline: as used herein refers to the playback or streaming of image data within a webpage, wherein the playback or streaming may not require a secondary application or window or may not require an affirmative action by a user.

Partial Video Asset: as used herein refers to a partial data package comprising less than complete audio data and/or video data. In some embodiments, a video asset (unprepared, prepared, or optimized) may comprise multiple partial video assets. In some aspects, the audio data may be isolated from the video data and transmitted separately. In some implementations, the partial video asset may be transmitted as incremental data, wherein subsequent data may build on prior transmitted partial video asset.

Prepared Video Asset: as used herein refers to a partially processed video asset, wherein the partial processing includes formatting the video asset based, at least in part upon mobile device criteria. In some embodiments, a prepared video asset may include the final stage of processing, wherein the prepared video asset may be streamed by the mobile device.

Optimized Video Asset: as used herein refers to a final processed video asset, wherein the final processing may format the video asset based on the display and projection criteria of a particular mobile device. In some embodiments, optimization and final processing for a particular mobile device may not be practical or necessary.

Video Asset: as used herein refers to a data package including one or both of image data and audio data, wherein the audio data may be paired with a display of the image data. In some embodiments, the image data may include a series of image data frames. Generally, the series of image data frames may be displayed in sequence as video data. In some aspects, a video asset may be uncoupled, wherein the uncoupling may allow for disparate processing of one or both the image data and the audio data.

Referring now to FIG. 1, exemplary method steps for processing a Video Asset into a prepared video asset are illustrated. Method steps are presented in a logical order but such order is not limiting unless specifically noted. Accordingly, other orders of implementing the method steps described fall within the scope of the present disclosure. At 100, a Video Asset prompt may be transmitted. At 105, a Video Asset may be received. At 110, the audio data may be isolated from the image data, which may allow for separate analysis and preparation of the audio data and image data. At 115, the audio data may be transcoded into a format compatible with mobile devices, and at 120, the audio data may be compressed. Similarly, at 125, the image data may be transcoded into a format compatible with mobile devices, and at 130, the image data may be compressed.

At 135, the prepared audio data and the prepared image data may be coupled into a prepared Video Asset. At 140, the prepared Video Asset may optionally be stored. At 145, the prepared Video Asset may be transmitted. At 150, the prepared Video Asset may be optionally played inline, wherein the prepared Video Asset may not be further processed.

As an illustrative example, upon receiving the Video Asset at 105, a media server may initiate processing at 110, wherein the audio data may be stripped away from the video data. In some embodiments, the audio data may not require further processing at 115-120 and stored discretely until the audio data is coupled back with the image data at 135. In some embodiments, at 130, the image data may be scaled to dimensions suited for playback on mobile devices. (e.g., 640×480 for 4:3 video, 768×432 for 16:9 video). In some embodiments, the image data may be optimized, such as described at 210-235 in FIG. 2, the image data may be adapted to a specific frame rate chosen either by the user or automatically by the media server (e.g. 24 fps).

In some embodiments at 130, the image data may be processed frame-by-frame, wherein each pixel may be analyzed and compared to the previous frame's pixel for changes. Where none are found, the current pixel's data may not be included in the final frame and the algorithm may advance to the next pixel in the frame. In some aspects, only the pixels that change from frame to frame may be stored in a process that is referred to as delta encoding, which may be optimal for the method used to playback the frames onto a canvas element.

In some implementations, the Video Asset may be further optimized, wherein optimization techniques may be used to decrease the data size for a given frame. For example, an image format that may allow for a limited color palette may allow for more effective compression at 130. In some embodiments, the GIF image format may be utilized for each partial frame, limiting the color palette to anywhere from 16 to 32 individual colors. The resulting Video Asset may be stored at 140, for example to disk or to a buffer in the media server's working memory.

Figure 2:
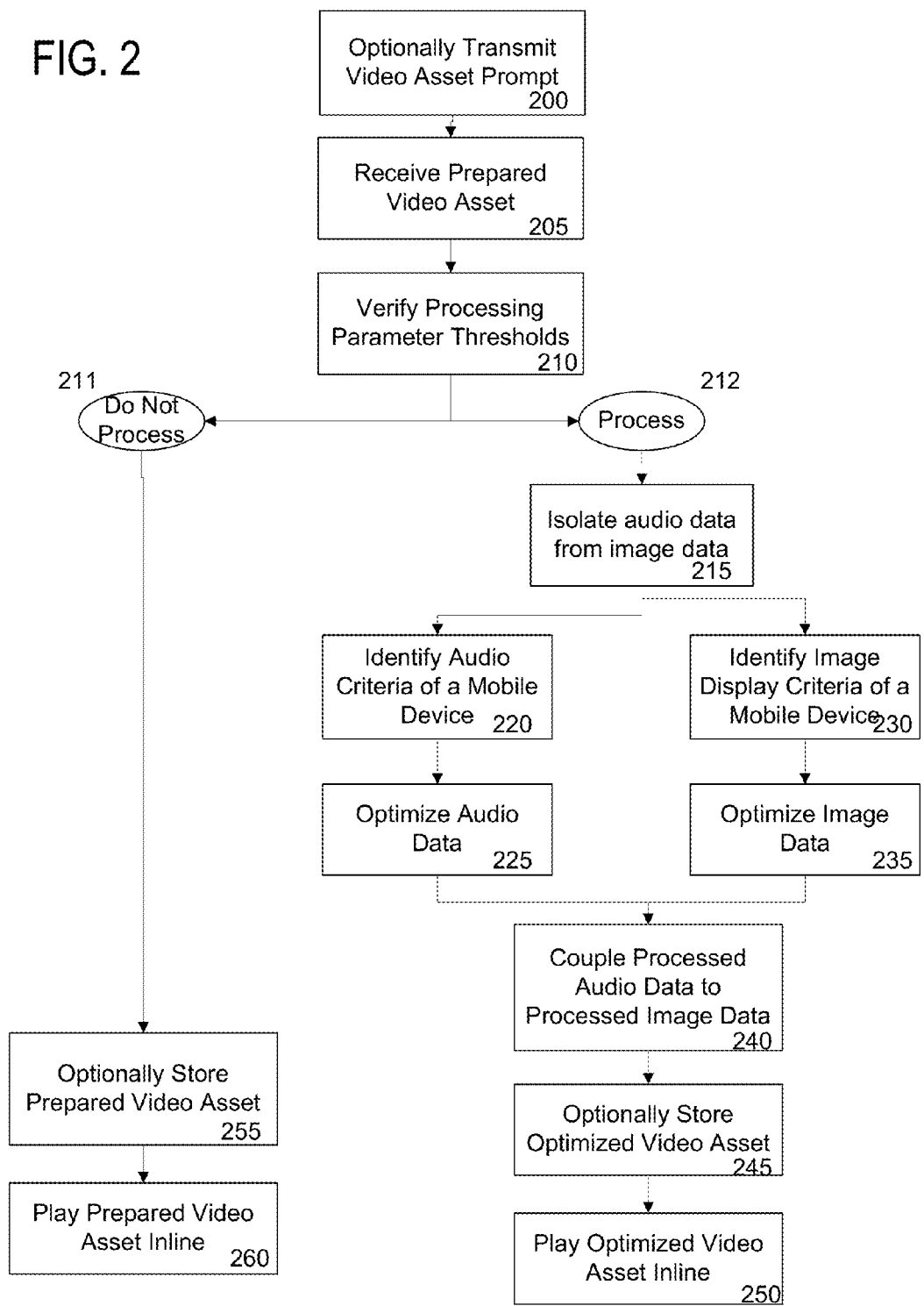
FIG. 2 illustrates exemplary method steps for processing a prepared video asset into an optimized video asset.

Referring now to FIG. 2, exemplary method steps for processing a prepared Video Asset into an optimized Video Asset are illustrated. At 200, a Video Asset prompt may be transmitted. At 205, the Video Asset or prepared asset may be received. At 210, the processing parameter thresholds may be verified. In some embodiments, the processing parameter thresholds may be based on original Video Asset quality, destination mobile device capabilities, user settings, current conditions, or combinations thereof.

In some aspects, at 211, the processing parameter thresholds may designate that further processing may not be required or may not be desirable. In some such aspects, at 255, the prepared Video Asset may be stored. At 260, the prepared Video Asset may be played inline.

In some embodiments, at 212, the processing parameter thresholds may prompt further processing. At 215, the audio data may be isolated from the image data. At 220, the optimum audio criteria for the mobile device may be identified, and at 225, the audio data may be optimized. At 230, the optimum image display criteria for the mobile device may be identified, and at 235, the image data may be optimized.

At 240, the optimized audio data and the optimized video data may be coupled into an optimized Video Asset. In some aspects, the optimized Video Asset may be stored. At 250, the optimized Video Asset may be played inline. In some embodiments, this process illustrated in FIG. 2 may be initiated when a web page loads. The optimized Video Asset may be stored temporarily at 245 until the inline video placement is located within the screen of the mobile device.

In some embodiments, the extent of Video Asset preparation may be determined by predefined parameters. In some aspects, a prepared Video Asset may be streamed inline without further optimization in certain conditions or for certain mobile device. For example, the general mobile device criteria for prepared Video Assets may be similar to the criteria of the particular mobile device, wherein optimization may provide nominal refinement.

In some embodiments, a Video Asset or prepared Video Asset may be further optimized where conditions may not meet predefined parameter thresholds, which may include, for example, network connection speed, RAM, remaining battery life, data plan limitations, screen resolutions, refresh rate, or other parameters. For example, optimization may be necessary where the network connection may not meet a predefined threshold, and without the optimization, the playback of the Video Asset or the prepared Video Asset may be of low quality, such as inconsistent, grainy, choppy, or unsynchronized playback of the image and audio data.

As an illustrative example, the steps described in FIG. 2 may comprise the steps to distribute the prepared Video Asset to a user. In some implementations, a WebSocket® connection may be established, wherein the media server may transmit a Video Asset prompt at 200, which may indicate the specific Video Asset to stream. Where the indicated Video Asset may be pre-recorded video, the media server may read the Video Asset from a persistent storage location (e.g., disk) and, at 245 or 255, may store them directly in a buffer in memory. In some aspects, the distribution process of FIG. 2 may read each frame from the memory buffer and split into fixed-size byte arrays. These byte-arrays may be transmitted as WebSocket® data to the client and the process may be repeated for subsequent frames. Upon delivery of the entire media asset the connection may be closed.

Figure 3:
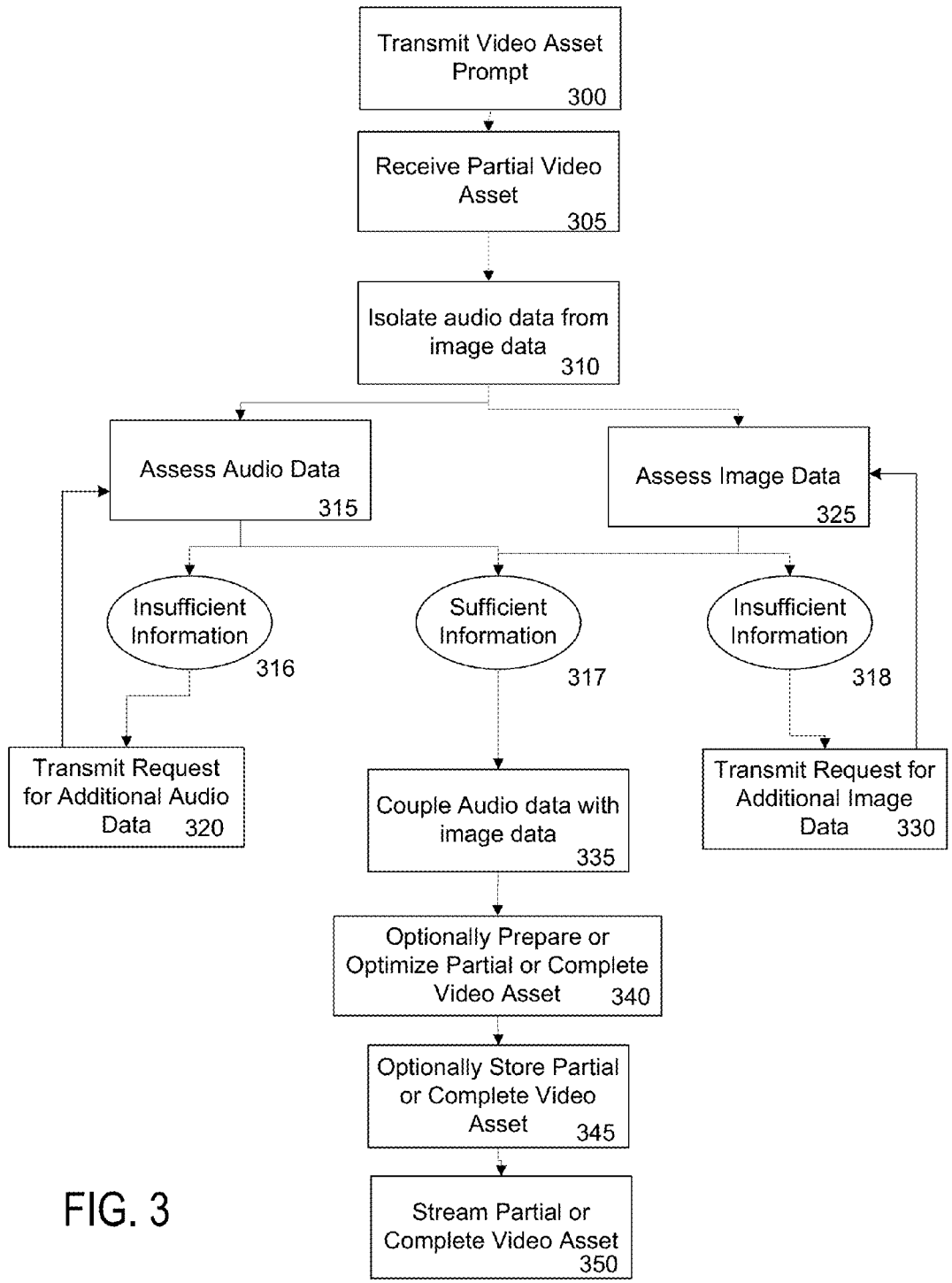
FIG. 3 illustrates exemplary method steps for processing a streaming video asset.

Referring now to FIG. 3, exemplary method steps for processing a streaming Video Asset are illustrated. A streaming Video Asset may comprise image and audio data that may be broadcasted from a live or continuous source. In some embodiments, a streaming Video Asset may be continuously or periodically processed, such as by frame, wherein the continuous processing may optimize the speed and quality of the image and audio play.

At 300, a Video Asset prompt may be transmitted. At 305, a partial Video Asset may be received. In some embodiments, partial processing may not be a necessary preparation step before the final processing for the optimized Video Asset. At 310, the audio data may be isolated from the image data. At 315, the audio data may be assessed, wherein the assessment may determine whether the audio data is sufficient to stream the audio. Where the information may be assessed as insufficient at 316, a request for additional audio data may be transmitted at 320. In some embodiments, the additional audio date may be reassessed at 315. Similarly, at 325, the image data may be assessed, wherein the assessment may determine whether the image data is sufficient to stream a complete image, such as a frame. Where there may be insufficient information at 318, a request for additional image data may be transmitted at 330. The additional image data may be assessed at 325.

The assessment loops may be continuous until there may be sufficient information for one or both the image data and audio data at 317. At 335, the audio data may be coupled with the image data, wherein the coupling comprises a partial or complete Video Asset. In some embodiments, at 340, the partial or complete Video Asset may be prepared or optimized, such as described and illustrated in FIGS. 1 and 2. At 345, the partial or complete image data may be streamed inline.

As an illustrative example, in some embodiments, upon loading a webpage including the video playback, the JavaScript® application code may instruct the browser to establish a WebSocket® connection to a backend server. At 300, upon establishing a connection, the application may send a specific asset-ID to the backend server. After receiving and locating the given asset-ID at 305, the backend server may begin streaming data back to the client at 345.

The data received at 305 in each partial Video Asset over the WebSocket® connection may comprise only part of the data necessary to build a frame. As soon as enough data has been received as to recreate a single original frame in its entirety at 317, the data may be assembled at 335, encoded using a base 64 scheme at 340, and then may be added to a buffer at 345. In some embodiments, the partial or complete Video Asset from the WebSocket® stream, which may result from the steps at 300-340, may allow the browser to begin playback of the partial Video Asset without having to first obtain the entire set of frames that make up the video stream.

In some embodiments, frame data may begin to populate the buffer, which may trigger the browser to begin a method of drawing these frames to the canvas element. In some aspects, a certain lead-time may be required before starting the playback at 350. In some implementations, this lead-time may be assessed or identified during the optimization and/or preparation of the partial Video Asset at 345. The preparation or optimization of the partial Video Asset may comprise a series of additional steps, such as, for example, those described in FIGS. 1 and 2.

For example, for a Video Asset comprising 100 frames for playback at 20 frames per second, complete playback may take 5 seconds. The mobile device may be configured to calculate that it is receiving 10 frames per second due to current bandwidth conditions and so it will take 10 seconds to download the entire video. In such aspects, such as at 235 in FIG. 2, the image data may optionally be configured to playback inline at 350 after 50 frames have been buffered, wherein the entire Video Asset may be played back inline without stopping to download additional frames.

Alternately, a minimum threshold may be set and identified at 230. For example, the program code may configure the mobile device to buffer 48 frames before beginning playback, at which point the browser may begin to draw these frames to the canvas element. This lead time may allow for smooth and consistent playback of the video stream after initially starting playback at 350. When a frame is pulled from the buffer and drawn to the canvas element, the audio track may be coupled with the current frame at 335. In some embodiments, where the audio data may not be synchronized with the image data, the playback position of the audio data may be adjusted, wherein the adjusting may allow the audio data and video data to play back in unison and synchronized.

In some embodiments, when a frame may pulled from the buffer and drawn to the canvas element, the synchronization of the audio data with the current frame may be assessed, and if not synchronized, the position of the audio data may be updated accordingly, thus keeping the audio and video streams playing back in unison. In some embodiments, when the end of the buffer may be reached, wherein no additional image data may be rendered to the canvas, the process for inline play may loop back to the beginning at 300 and start the video over again, or the user may be prompted for interaction.

Playback of frames in a client browser may be further improved by utilizing a technique known as motion interpolation, such as known in the art. This technique may improve the perceived quality of the rendered video stream by enhancing frame-rate. For every frame sent to a client, intermediate frames may be generated and rendered prior to displaying the received frame.

Where a user may change the browser's viewport size, for example rotating the device from portrait to landscape, the canvas element may be dynamically resized using hardware-accelerated methods leveraging the graphics processing unit in the device and the video content may continue to be displayed.

Figure 4:
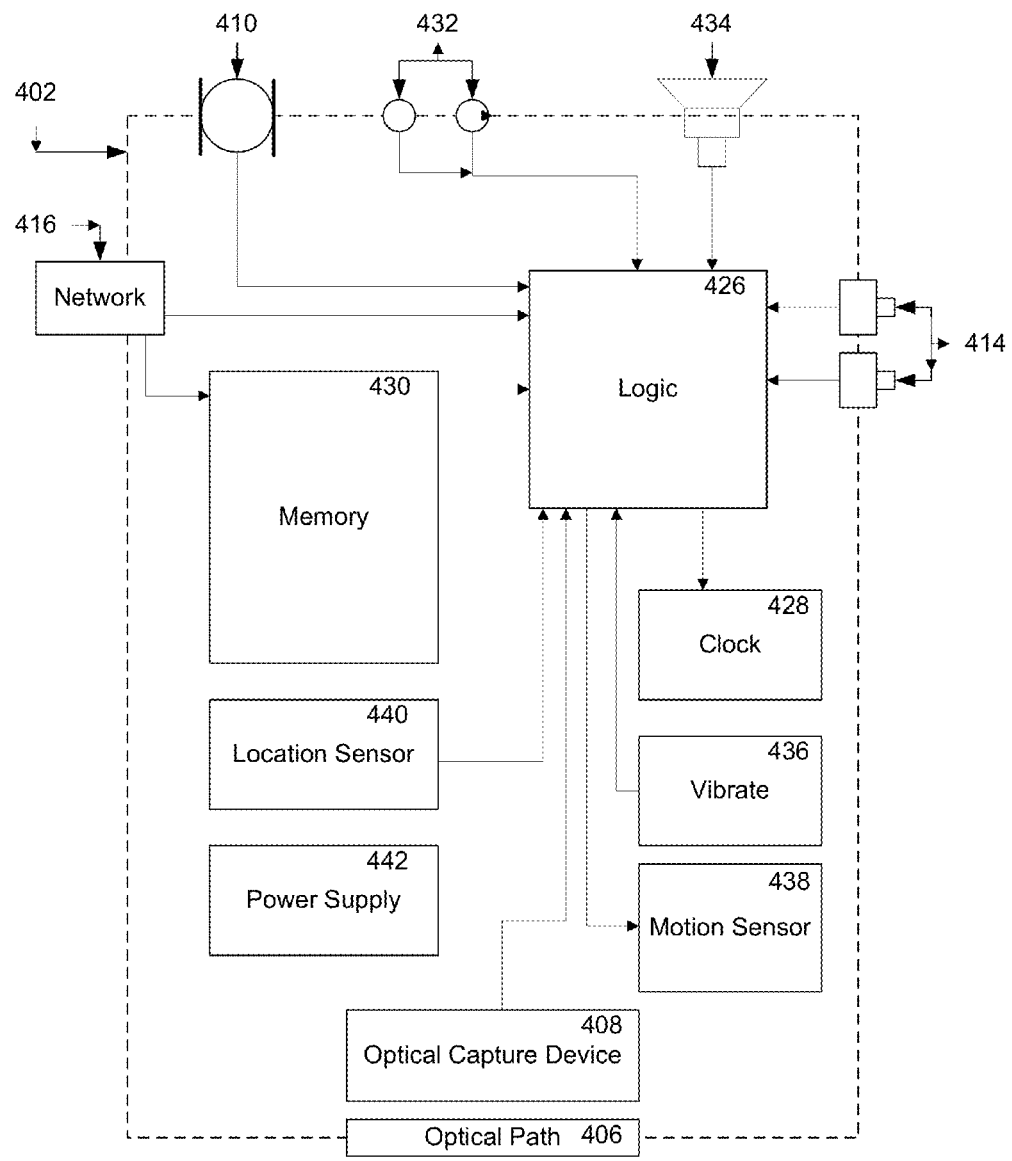
FIG. 4 illustrates a block diagram of an exemplary embodiment of a mobile device.

Referring now to FIG. 4, a block diagram of an exemplary embodiment of a mobile device 402 is illustrated. The mobile device 402 may comprise an optical capture device 408, which may capture an image and convert it to machine-compatible data, and an optical path 406, typically a lens, an aperture, or an image conduit to convey the image from the rendered document to the optical capture device 408. The optical capture device 408 may incorporate a Charge-Coupled Device (CCD), a Complementary Metal Oxide Semiconductor (CMOS) imaging device, or an optical sensor of another type.

In some embodiments, the mobile device 402 may comprise a microphone 410, wherein the microphone 410 and associated circuitry may convert the sound of the environment, including spoken words, into machine-compatible signals. Input facilities 414 may exist in the form of buttons, scroll-wheels, or other tactile sensors such as touch-pads. In some embodiments, input facilities 414 may include a touch-screen display. Visual feedback 432 to the user may occur through a visual display, touchscreen display, or indicator lights. Audible feedback 434 may be transmitted through a loudspeaker or other audio transducer. Tactile feedback may be provided through a vibration module 436.

In some aspects, the mobile device 402 may comprise a motion sensor 438, wherein the motion sensor 438 and associated circuitry may convert the motion of the mobile device 402 into machine-compatible signals. For example, the motion sensor 438 may comprise an accelerometer, which may be used to sense measurable physical acceleration, orientation, vibration, and other movements. In some embodiments, the motion sensor 438 may comprise a gyroscope or other device to sense different motions.

In some implementations, the mobile device 402 may comprise a location sensor 440, wherein the location sensor 440 and associated circuitry may be used to determine the location of the device. The location sensor 440 may detect Global Position System (GPS) radio signals from satellites or may also use assisted GPS where the mobile device may use a cellular network to decrease the time necessary to determine location. In some embodiments, the location sensor 440 may use radio waves to determine the distance from known radio sources such as cellular towers to determine the location of the mobile device 402. In some embodiments these radio signals may be used in addition to and/or in conjunction with GPS.

In some aspects, the mobile device 402 may comprise a logic module 426, which may place the components of the mobile device 402 into electrical and logical communication. The electrical and logical communication may allow the components to interact. Accordingly, in some embodiments, the received signals from the components may be processed into different formats and/or interpretations to allow for the logical communication. The logic module 426 may be operable to read and write data and program instructions stored in associated storage 430, such as RAM, ROM, flash, or other suitable memory. In some aspects, the logic module 426 may read a time signal from the clock unit 428. In some embodiments, the mobile device 402 may comprise an on-board power supply 442. In some embodiments, the mobile device 402 may be powered from a tethered connection to another device, such as a Universal Serial Bus (USB) connection.

In some implementations, the mobile device 402 may comprise a network interface 416, which may allow the mobile device 402 to communicate and/or receive data to a network and/or an associated computing device. The network interface 416 may provide two-way data communication. For example, the network interface 416 may operate according to an internet protocol. As another example, the network interface 416 may comprise a local area network (LAN) card, which may allow a data communication connection to a compatible LAN. As another example, the network interface 416 may comprise a cellular antenna and associated circuitry, which may allow the mobile device to communicate over standard wireless data communication networks. In some implementations, the network interface 416 may comprise a Universal Serial Bus (USB) to supply power or transmit data. In some embodiments, other wireless links known to those skilled in the art may also be implemented.

Figure 5:
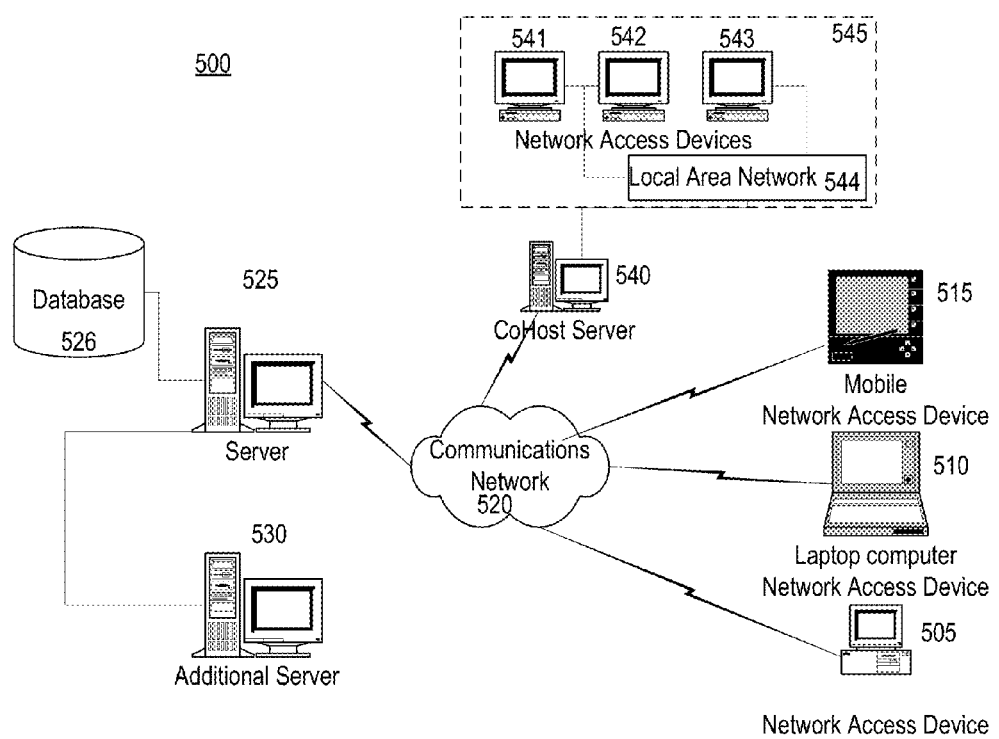
FIG. 5 illustrates an exemplary processing and interface system.

Referring now to FIG. 5, an exemplary processing and interface system 500 is illustrated. In some aspects, access devices 515, 510, 505, such as a mobile device 515 or laptop computer 510 may be able to communicate with an external server 525 through a communications network 520. The external server 525 may be in logical communication with a database 526, which may comprise data related to identification information and associated profile information. In some examples, the server 525 may be in logical communication with an additional server 530, which may comprise supplemental processing capabilities.

In some aspects, the server 525 and access devices 505, 510, 515 may be able to communicate with a cohost server 540 through a communications network 520. The cohost server 540 may be in logical communication with an internal network 545 comprising network access devices 541, 542, 543 and a local area network 544. For example, the cohost server 540 may comprise a payment service, such as PayPal or a social network, such as Facebook or a dating website.

Figure 6:
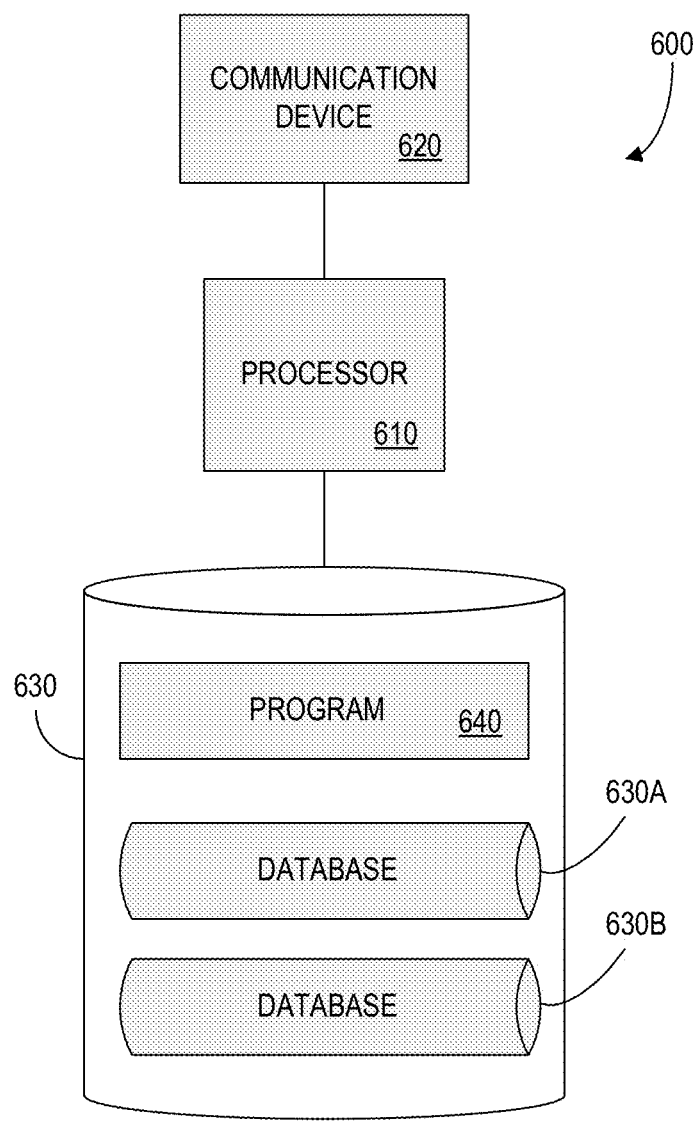
FIG. 6 illustrates an exemplary controller that may be embodied in one or more of the above listed devices and utilized to implement some embodiments of the present disclosure.

Referring now to FIG. 6, a controller 600 that may be embodied in one or more of the above listed devices and utilized to implement some embodiments of the present disclosure is illustrated. In some embodiments, the controller 600 may comprise a processor unit 610, such as one or more processors, coupled to a communication device 620 configured to communicate via a communication network (not shown in FIG. 6). In some aspects, the communication device 620 may be used to communicate, for example, with one or more online devices, such as a personal computer, laptop, or a handheld device.

In some aspects, the processor 610 may be in electrical and/or logical communication with a storage device 630. The storage device 630 may comprise any appropriate information storage device, including combinations of electronic storage devices, such as, for example, one or more of: hard disk drives, optical storage devices, and semiconductor memory devices such as Random Access Memory (RAM) devices and Read Only Memory (ROM) devices.

In some embodiments, the storage device 630 may store a program 640 for controlling the processor 610. The processor 610 may perform instructions of the program 640, and thereby may operate in accordance with the present disclosure. In some aspects, the processor 610 may cause the communication device 620 to transmit information, including, for example, control commands to operate apparatus to implement the processes described above. In some implementations, the storage device 630 may additionally store related data in a database 630A and database 630B, as needed.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An inline video playback system comprising:
    a communication interface that communicates over a communications network, wherein the communication interface:
        transmits a prompt for a video asset to a server, and
        receives the video asset from the server, wherein the received video asset comprises audio data and image data; and
    a processor that executes executable software stored in memory, wherein execution of the software
        identifies audio criteria and display criteria for a network-connected video playback device, wherein the audio criteria are specific to audio capabilities of the network-connected video playback device and the display criteria are specific to display capabilities of the network-connected video playback device;
        isolates the audio data from the image data;
        prepares the isolated image data for inline playback based on the display criteria;
        separately prepares the isolated audio data based on the audio criteria;
        couples the prepared audio data with the prepared image data, wherein coupling the prepared audio data with the prepared image data creates a prepared video asset; and play the prepared video asset at the network-connected video playback device, wherein the prepared video asset is played inline in context with other webpage content.

2. The inline video playback system of claim 1, wherein the network-connected video playback device comprises a cellular phone.

3. The inline video playback system of claim 1, wherein the network-connected video playback device comprises a tablet device.

4. The inline video playback system of claim 1, wherein the communications network comprises a cellular network.

5. The inline video playback system of claim 1, wherein the communications network comprises a wireless Internet Protocol network.

6. The inline video playback system of claim 1, further comprising a logical connector to an auxiliary display, wherein the software is additionally executed to cause the prepared image data to play on the auxiliary display.

7. The inline video playback system of claim 1, further comprising a logical connector to an auxiliary audio player, wherein the software is additionally executed to cause the prepared audio data to play on the auxiliary audio player.

8. The inline video playback system of claim 1, wherein the memory further stores the prepared video asset.

9. The inline video playback system of claim 1, wherein the preparation of the isolated image data further comprises:
compression of the image data; and
transcoding of the image data.

10. A method for inline video playback, the method comprising:
transmitting a prompt for a video asset over a communication network;
receiving the video asset, wherein the received video asset comprises audio data and image data;
executing software stored in memory, wherein execution of the software by a processor:
identifies audio criteria and display criteria for a network-connected video playback device, wherein the audio criteria are specific to audio capabilities of the network-connected video playback device and the display criteria are specific to display capabilities of the network-connected video playback device;
isolates the audio data from the image data;
prepares the isolated image data for inline playback based on the display criteria;
separately prepares the isolated audio data based on the audio criteria;
couples the prepared audio data with the prepared image data, wherein coupling the prepared audio data with the prepared image data creates a prepared video asset;
playing the prepared video asset at the network-connected video playback device, wherein the prepared video asset is played inline in context with other webpage content.

11. The method of claim 10, wherein the network-connected video playback device comprises a cellular phone.

12. The method of claim 10, wherein the network-connected video playback device comprises a tablet device.

13. The method of claim 10, wherein the communications network comprises a cellular network.

14. The method of claim 10, wherein the communications network comprises a wireless Internet Protocol network.

15. The method of claim 10, wherein further execution of the software plays the prepared image data on an auxiliary display.

16. The method of claim 10, wherein further execution of the software plays the prepared audio data to play on an auxiliary audio player.

17. The method of claim 10, further comprising storing the prepared video asset in memory.

18. The method of claim 10, wherein preparing the isolated image data comprises:
compressing the image data; and
transcoding the image data.

19. A non-transitory computer-readable storage medium, having embodied thereon a program executable by a processor to perform a method for inline video playback, the method comprising:
transmitting a prompt for a video asset over a communication network;
receiving the video asset, wherein the received video asset comprises audio data and image data;
identifying audio criteria and display criteria for a network-connected video playback device, wherein the audio criteria are specific to audio capabilities of the network-connected video playback device and the display criteria are specific to display capabilities of the network-connected video playback device;
isolating the audio data from the image data;
preparing the isolated image data for inline playback based on the display criteria;
separately preparing the isolated audio data based on the audio criteria;
coupling the prepared audio data with the prepared image data, wherein coupling the prepared audio data with the prepared image data creates a prepared video asset;
playing the prepared video asset at the network-connected video playback device, wherein the video asset is played inline in context with other webpage content.

* * * * *